F. G. BEETEM.
SUSPENSION FOR TRAIN LIGHTING DYNAMOS.
APPLICATION FILED JULY 27, 1921. RENEWED MAR. 17, 1922.

1,415,083.

Patented May 9, 1922.

INVENTOR
Frank G Beetem
BY
Augustus B. Stoughton
ATTORNEY.

WITNESS:
Robt R Ketchel

F. G. BEETEM.
SUSPENSION FOR TRAIN LIGHTING DYNAMOS.
APPLICATION FILED JULY 27, 1921. RENEWED MAR. 17, 1922.

1,415,083.

Patented May 9, 1922.
2 SHEETS—SHEET 2.

WITNESS:
Rob't R. Kitchel.

INVENTOR
Frank G. Beetem
BY
Augustus B. Stoughton
ATTORNEY

UNITED STATES PATENT OFFICE.

FRANK G. BEETEM, OF PHILADELPHIA, PENNSYLVANIA.

SUSPENSION FOR TRAIN-LIGHTING DYNAMOS.

1,415,083.   Specification of Letters Patent.   Patented May 9, 1922.

Application filed July 27, 1921, Serial No. 487,947.   Renewed March 17, 1922.   Serial No. 544,683.

*To all whom it may concern:*

Be it known that I, FRANK G. BEETEM, a citizen of the United States, residing at Philadelphia, in the county of Philadelphia and State of Pennsylvania, have invented certain new and useful Improvements in Suspensions for Train-Lighting Dynamos, of which the following is a specification.

My invention relates to car lighting systems in which a dynamo suspended from the car is driven by a belt from one of the axles, and one of the objects of my invention is to provide simpler, less expensive and more reliable means for quickly adjusting the tension of the belt and for quickly releasing the belt tension when required. This, and other objects, will be more clearly understood by reference to the following description which will be given in connection with the accompanying drawings forming part hereof and in which—

Figure 1:
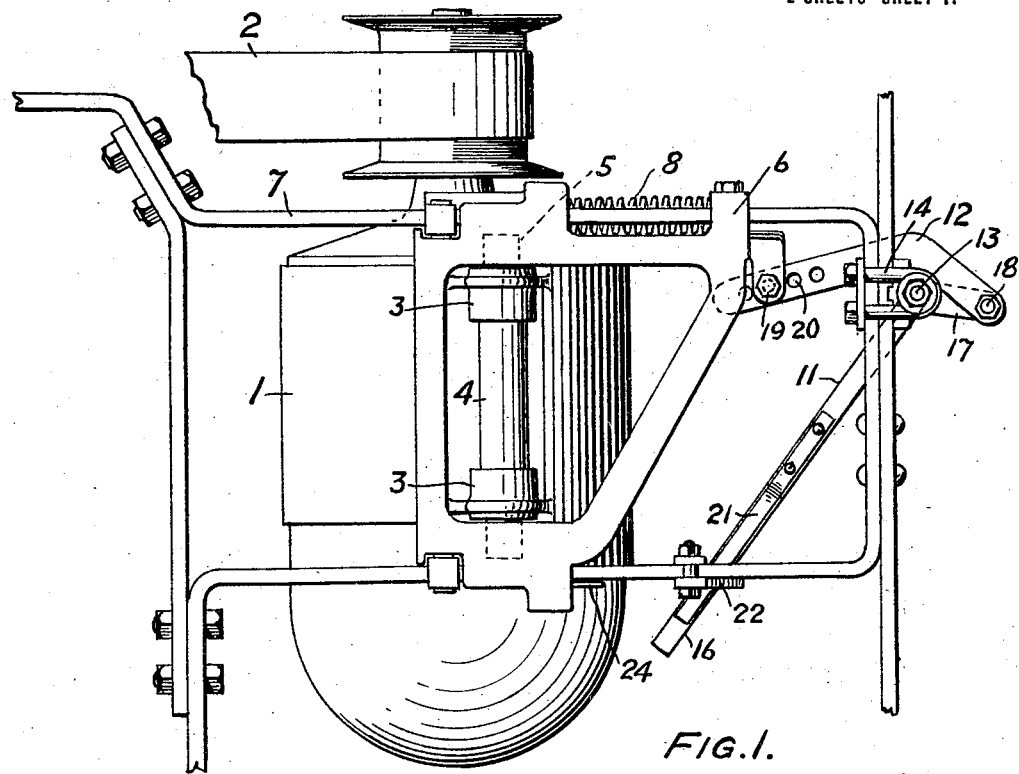
Figure 1 is a plan view of a suspension embodying features of my invention and showing the parts in the operating position.
Figure 2:
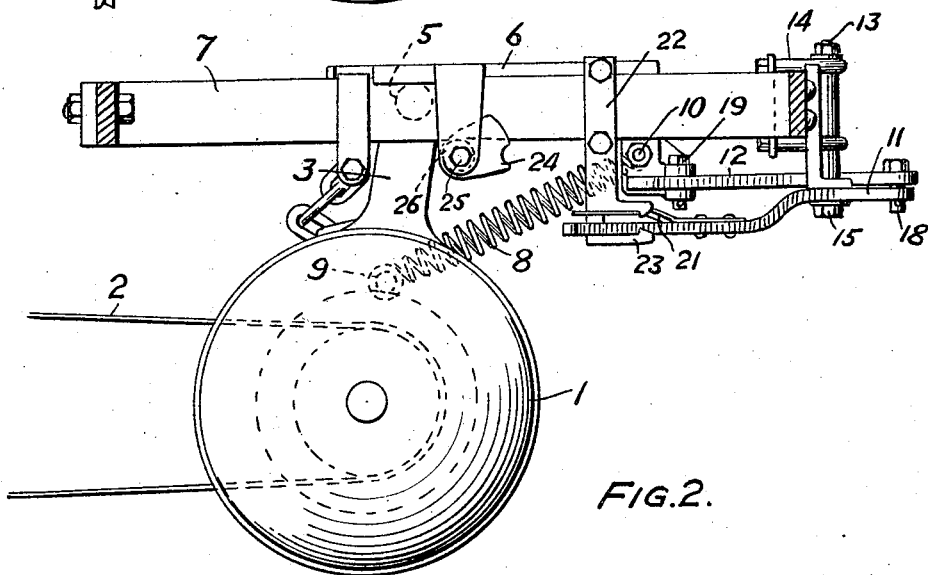
Fig. 2 is a side elevation of the apparatus shown in Figure 1.

In the drawing, 1 is a car lighting dynamo adapted for suspension from the under frame of a car and driven from the car axle by a belt 2 through the intervention of a pulley on the car axle. The dynamo is provided with lugs 3 extending upward from its frame and carrying a tubular bushing 4 within which is located a bearing pin 5, from which the dynamo is supported and on which it is free to swing. The ends of the bearing pin fit into holes in the carriage frame 6 which is designed to support the bearing pin 5. The carriage frame 6 is in turn supported on a frame of wrought iron bars 7, upon which frame the carriage 6 is adapted to slide horizontally. A tension spring 8 is pivotally connected at one end to the dynamo, as at 9, and at the other end to the carriage 6, as at 10. As the carriage is moved away from the axle which drives the dynamo, the spring 8 is extended and any desired tension is thereby applied to the belt. As the carriage 6 is moved toward the driving axle, the tension of the spring 8 is released and the belt is slackened. The extended position of the spring is shown in Figures 1 and 2, while in Figures 3 and 4 the carriage is shown moved to the left so that the spring 8 is collapsed and the tension on the belt is released. In this position the belt may be readily removed if desired.

The movement of the carriage 6 along the frame 7 is effected by means of a lever 11 and a link 12. The lever 11 is pivotally supported from the frame 7 by means of a king bolt 13, which is firmly clamped to the frame 7 by means of the U-bolts 14. The king bolt 13 extends below the frame 7, passing through a hole in the lever 11, the latter being supported in position by means of the nut 15. The lever 11 consists of a long arm 16 and a short arm 17, these two arms being on opposite sides of the fulcrum provided by the king bolt 13, and arranged nearly at right angles to each other.

The link 12 is pivoted at its outer end to the outer end of the short lever arm 17 by means of a pin 18 and at its inner end it is pivoted to the carriage 6 by means of a pin 19. The link 12 is bent so as to clear the king bolt 13 and is provided at its inner end with a series of holes 20, any one of which may be used for receiving the pin 19, thereby providing for various positions of the carriage 6, when the lever 11 is in the operating position shown in Figures 1 and 2. This adjustment of the position of the carriage 6 provides for varying the belt tension, or for adjusting the position of the dynamo to different lengths of belt. This adjustment is of special advantage in case the belt should stretch, or in case it is necessary to cut out a defective portion of the belt, thus reducing its length.

Riveted to the lever 11 is a flat strip of spring steel, or similar material 21, which is bent so as to be offset from the lever 11 at its end. A latching device 22 is fastened to an arm of the frame 7 extending below the latter, and provided with two horizontal jaws 23, notched to receive between them the lever 11 and the spring 21, as shown in Figs. 1 and 2. These jaws by reason of the notches retain the lever in the operative position, but by compressing the spring 21, and slightly raising the lever 11, the latter can be released from the jaws 23 and thrown around into the position shown in Figs. 3 and 4.

Figure 3:
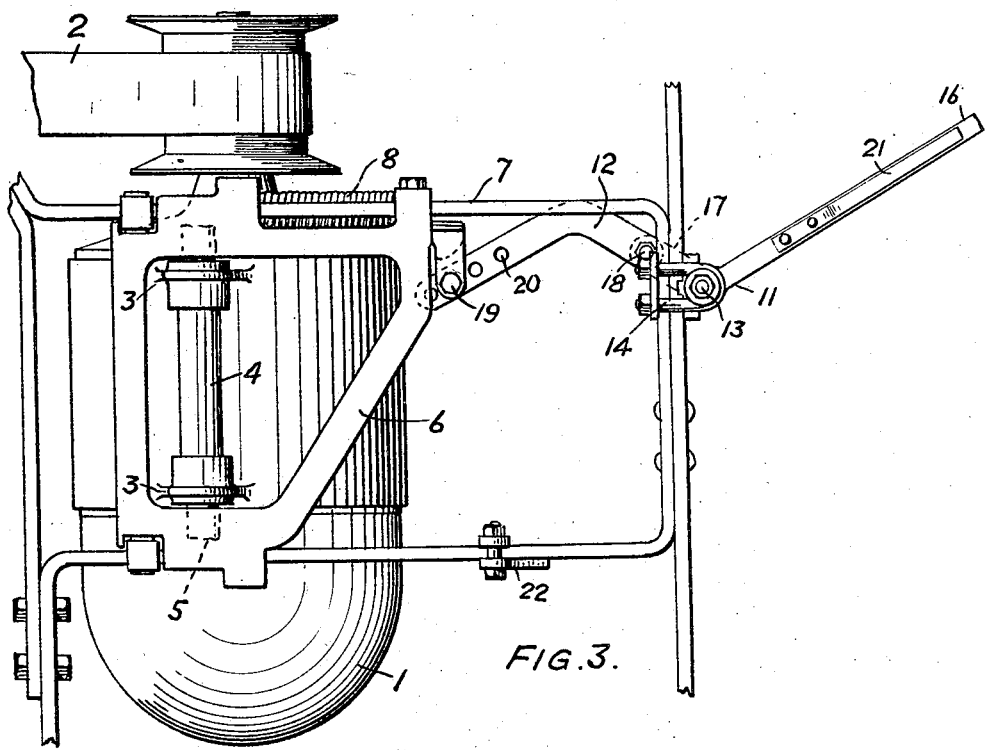
Fig. 3 is a plan view of the same suspension shown in Figure 1, but with the parts in a position to release the belt tension.
Figure 4:
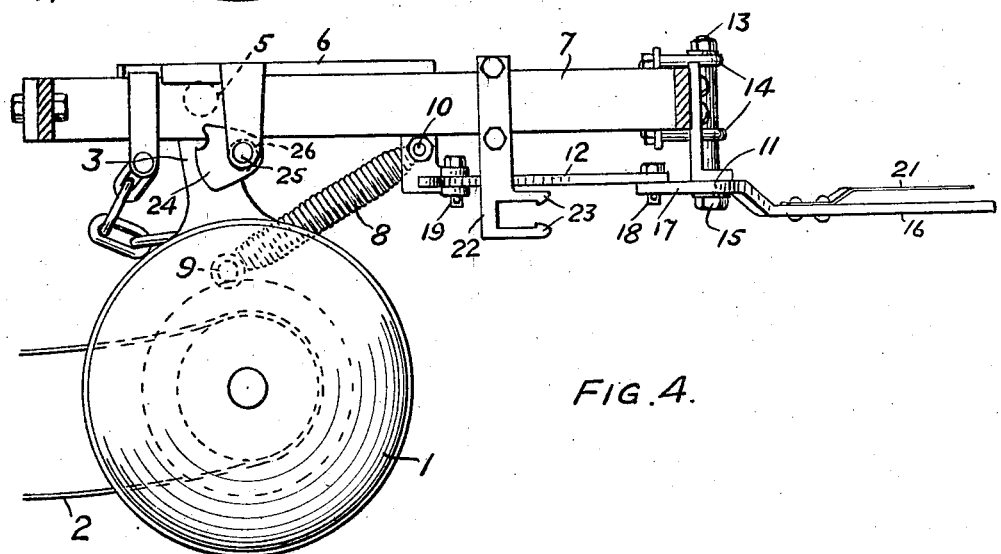
Fig. 4 is a side elevation of the suspension shown in Fig 3.

In the position of the apparatus shown in Figs. 3 and 4, the pin 18 at the short end of the lever 11 is thrown backward, and by reason of the link 12, the carriage 6 is moved backward until there is no longer any tension on the belt and the spring 8 is collapsed. In this position, as referred to above, the belt can readily be removed and there being no tension on the spring 8, the pin 19 can readily be removed and inserted in another hole in the link 12, if desired.

It will be noted also by reference to Figs. 1 and 2 that in the running position the pin 18 has been thrown past the center, so that the tension of the belt transmitted through the spring 8 to the carriage 6, and tending to pull the carriage 6 toward the left, will exert a force on the pin 18 tending to throw it still further around, and therefore tending to throw the long arm 16 of the lever 11 against the latching device 22, which acts as a stop. This design, therefore, provides a double assurance against any tendency in service for the lever 11 to swing around into the released position.

In addition to this double safeguard, a wedging device 24 is provided, pivoted from the carriage 6 beneath an arm of the frame 7 by means of the pin 25. This wedging device 24 is provided with an eccentric cylindrical surface 26, which when the device 24 is rotated into the position shown in Fig. 2 firmly clamps the carriage 6 down on the arm of the frame 7. When the wedging device 24 is rotated in a counter-clockwise direction to the position shown in Fig. 4, the clamping action is released.

It will be obvious to those skilled in art that modifications may be made in details of construction and arrangement without departing from the spirit of the invention which is not limited as to those matters or otherwise than as the state of the art and the appended claims may require:

I claim:

1. In a car lighting system the combination of a suspension carriage, a support for the carriage permitting longitudinal motion thereof with respect to the car, a dynamo pivotally supported from the carriage, means for driving the dyanmo from the car axle, a lever fulcrumed from a point fixed with respect to the car, and a link connecting the lever with the carriage whereby the position of the latter may be adjusted with respect to the car.

2. In a car lighting system the combination of a suspension carriage, a support for the carriage permitting longitudinal motion thereof with respect to the car, a dynamo pivotally supported from the carriage, means for driving the dyanmo from the car axle, a lever fulcrumed from a point fixed with respect to the car, and a link, adjustable as to its active length, connecting the lever with the carriage whereby the position of the latter may be adjusted with respect to the car.

3. In a car lighting system the combination of a suspension carriage, a support for the carriage permitting longitudinal motion thereof with respect to the car, a dynamo pivotally supported from the carriage, means for driving the dynamo from the car axle, a spring for the dynamo, a lever fulcrumed from a point fixed with respect to the car and a link connecting the lever with the carriage whereby the position of the latter may be adjusted with respect to the car.

4. In a car lighting system the combination of a suspension carriage, a support for the carriage permitting longitudinal motion thereof with respect to the car, a dynamo pivotally supported from the carriage, means for driving the dynamo from the car axle, a spring interposed between the dynamo and the carriage, a lever fulcrumed from a point fixed with respect to the car, and a link connecting the lever with the carriage whereby the position of the latter may be adjusted with respect to the car.

5. In a car lighting system the combination of a suspension carriage, a support for the carriage permitting longitudinal motion thereof with respect to the car, a dynamo pivotally supported from the carriage, means for driving the dynamo from the car axle, a lever fulcrumed from a point fixed with respect to the car, a link connecting the lever with the carriage whereby the position of the latter may be adjusted with respect to the car, and a latch for holding the lever in its operating position.

6. In a car lighting system the combination of a driving axle and pulley, a suspension carriage, a support for the carriage permitting longitudinal motion thereof with respect to the car, a dynamo pivotally supported from the carriage, a belt for driving the dynamo from the axle pulley, a spring for the dynamo, a lever fulcrumed from a point fixed with respect to the car, a link connecting the lever with the carriage whereby the position of the latter may be adjusted with respect to the driving axle, and a stop fixed with respect to the car and located to prevent further motion of the lever after it has passed the position corresponding to the maximum distance of the carriage from the driving axle.

FRANK G. BEETEM.